(12) United States Patent
Beker

(10) Patent No.: US 9,165,583 B1
(45) Date of Patent: Oct. 20, 2015

(54) DATA STORAGE DEVICE ADJUSTING SEEK PROFILE BASED ON SEEK LENGTH WHEN ENDING TRACK IS NEAR RAMP

(71) Applicant: Western Digital Technologies, Inc., Irvine, CA (US)

(72) Inventor: Orhan Beker, Dove Canyon, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/526,742

(22) Filed: Oct. 29, 2014

(51) Int. Cl.
G11B 5/55 (2006.01)

(52) U.S. Cl.
CPC .................................. *G11B 5/5547* (2013.01)

(58) Field of Classification Search
None
See application file for complete search history.

(56) References Cited

U.S. PATENT DOCUMENTS

| | | | |
|---|---|---|---|
| 5,825,581 A * | 10/1998 | Morita et al. | 360/78.07 |
| 6,014,283 A | 1/2000 | Codilian et al. | |
| 6,052,076 A | 4/2000 | Patton, III et al. | |
| 6,052,250 A | 4/2000 | Golowka et al. | |
| 6,067,206 A | 5/2000 | Hull et al. | |
| 6,078,453 A | 6/2000 | Dziallo et al. | |
| 6,091,564 A | 7/2000 | Codilian et al. | |
| 6,094,020 A | 7/2000 | Goretzki et al. | |
| 6,101,065 A | 8/2000 | Alfred et al. | |
| 6,104,153 A | 8/2000 | Codilian et al. | |
| 6,122,133 A | 9/2000 | Nazarian et al. | |
| 6,122,135 A | 9/2000 | Stich | |
| 6,141,175 A | 10/2000 | Nazarian et al. | |
| 6,160,368 A | 12/2000 | Plutowski | |
| 6,169,382 B1 * | 1/2001 | McKenzie et al. | 318/561 |
| 6,181,502 B1 | 1/2001 | Hussein et al. | |
| 6,195,222 B1 | 2/2001 | Heminger et al. | |
| 6,198,584 B1 | 3/2001 | Codilian et al. | |
| 6,198,590 B1 | 3/2001 | Codilian et al. | |
| 6,204,988 B1 | 3/2001 | Codilian et al. | |
| 6,243,223 B1 | 6/2001 | Elliott et al. | |
| 6,279,108 B1 * | 8/2001 | Squires et al. | 712/244 |
| 6,281,652 B1 | 8/2001 | Ryan et al. | |
| 6,285,521 B1 | 9/2001 | Hussein | |
| 6,292,320 B1 | 9/2001 | Mason et al. | |
| 6,310,742 B1 | 10/2001 | Nazarian et al. | |
| 6,320,718 B1 | 11/2001 | Bouwkamp et al. | |
| 6,342,984 B1 | 1/2002 | Hussein et al. | |
| 6,347,018 B1 | 2/2002 | Kadlec et al. | |
| 6,369,972 B1 | 4/2002 | Codilian et al. | |
| 6,369,974 B1 | 4/2002 | Asgari et al. | |
| 6,396,652 B1 | 5/2002 | Kawachi et al. | |
| 6,462,896 B1 | 10/2002 | Codilian et al. | |
| 6,476,996 B1 | 11/2002 | Ryan | |
| 6,484,577 B1 | 11/2002 | Bennett | |
| 6,493,169 B1 | 12/2002 | Ferris et al. | |
| 6,496,324 B1 | 12/2002 | Golowka et al. | |
| 6,498,698 B1 | 12/2002 | Golowka et al. | |
| 6,507,450 B1 | 1/2003 | Elliott | |
| 6,534,936 B2 | 3/2003 | Messenger et al. | |
| 6,538,839 B1 | 3/2003 | Ryan | |
| 6,545,835 B1 | 4/2003 | Codilian et al. | |
| 6,549,359 B1 | 4/2003 | Bennett et al. | |
| 6,549,361 B1 | 4/2003 | Bennett et al. | |

(Continued)

*Primary Examiner* — Wayne Young
*Assistant Examiner* — James L Habermehl

(57) ABSTRACT

A data storage device is disclosed comprising a head actuated over a disk comprising a plurality of tracks, and a load/unload ramp. When seeking the head a seek length from a starting track to an ending track, control circuit is configured to adjust a seek profile when the seek length is greater than a first threshold and the ending track is within a second threshold of the load/unload ramp.

10 Claims, 4 Drawing Sheets

(56) References Cited

U.S. PATENT DOCUMENTS

| | | | |
|---|---|---|---|
| 6,560,056 B1 | 5/2003 | Ryan | |
| 6,568,268 B1 | 5/2003 | Bennett | |
| 6,574,062 B1 | 6/2003 | Bennett et al. | |
| 6,577,465 B1 | 6/2003 | Bennett et al. | |
| 6,603,922 B1 * | 8/2003 | Shino et al. | 386/278 |
| 6,614,615 B1 | 9/2003 | Ju et al. | |
| 6,614,618 B1 | 9/2003 | Sheh et al. | |
| 6,636,377 B1 | 10/2003 | Yu et al. | |
| 6,687,081 B1 * | 2/2004 | O'Hara et al. | 360/78.07 |
| 6,690,536 B1 | 2/2004 | Ryan | |
| 6,693,764 B1 | 2/2004 | Sheh et al. | |
| 6,707,635 B1 | 3/2004 | Codilian et al. | |
| 6,710,953 B1 | 3/2004 | Vallis et al. | |
| 6,710,966 B1 | 3/2004 | Codilian et al. | |
| 6,714,371 B1 | 3/2004 | Codilian | |
| 6,714,372 B1 | 3/2004 | Codilian et al. | |
| 6,724,564 B1 | 4/2004 | Codilian et al. | |
| 6,731,450 B1 | 5/2004 | Codilian et al. | |
| 6,735,041 B1 | 5/2004 | Codilian et al. | |
| 6,738,220 B1 | 5/2004 | Codilian | |
| 6,747,837 B1 | 6/2004 | Bennett | |
| 6,760,186 B1 | 7/2004 | Codilian et al. | |
| 6,788,483 B1 | 9/2004 | Ferris et al. | |
| 6,791,785 B1 | 9/2004 | Messenger et al. | |
| 6,795,268 B1 | 9/2004 | Ryan | |
| 6,819,518 B1 | 11/2004 | Melkote et al. | |
| 6,826,006 B1 | 11/2004 | Melkote et al. | |
| 6,826,007 B1 | 11/2004 | Patton, III | |
| 6,847,502 B1 | 1/2005 | Codilian | |
| 6,850,383 B1 | 2/2005 | Bennett | |
| 6,850,384 B1 | 2/2005 | Bennett | |
| 6,867,944 B1 | 3/2005 | Ryan | |
| 6,876,508 B1 | 4/2005 | Patton, III et al. | |
| 6,882,496 B1 | 4/2005 | Codilian et al. | |
| 6,885,514 B1 | 4/2005 | Codilian et al. | |
| 6,900,958 B1 | 5/2005 | Yi et al. | |
| 6,900,959 B1 | 5/2005 | Gardner et al. | |
| 6,903,897 B1 | 6/2005 | Wang et al. | |
| 6,914,740 B1 | 7/2005 | Tu et al. | |
| 6,914,743 B1 | 7/2005 | Narayana et al. | |
| 6,920,004 B1 | 7/2005 | Codilian et al. | |
| 6,924,959 B1 | 8/2005 | Melkote et al. | |
| 6,924,960 B1 | 8/2005 | Melkote et al. | |
| 6,924,961 B1 | 8/2005 | Melkote et al. | |
| 6,934,114 B1 | 8/2005 | Codilian et al. | |
| 6,934,135 B1 | 8/2005 | Ryan | |
| 6,937,420 B1 | 8/2005 | McNab et al. | |
| 6,937,423 B1 | 8/2005 | Ngo et al. | |
| 6,937,431 B2 * | 8/2005 | Galloway | 360/78.06 |
| 6,952,322 B1 | 10/2005 | Codilian et al. | |
| 6,954,324 B1 | 10/2005 | Tu et al. | |
| 6,958,881 B1 | 10/2005 | Codilian et al. | |
| 6,963,465 B1 | 11/2005 | Melkote et al. | |
| 6,965,488 B1 | 11/2005 | Bennett | |
| 6,967,458 B1 | 11/2005 | Bennett et al. | |
| 6,967,811 B1 | 11/2005 | Codilian et al. | |
| 6,970,319 B1 | 11/2005 | Bennett et al. | |
| 6,972,539 B1 | 12/2005 | Codilian et al. | |
| 6,972,540 B1 | 12/2005 | Wang et al. | |
| 6,972,922 B1 | 12/2005 | Subrahmanyam et al. | |
| 6,975,480 B1 | 12/2005 | Codilian et al. | |
| 6,977,789 B1 | 12/2005 | Cloke | |
| 6,977,794 B1 * | 12/2005 | Sun et al. | 360/78.06 |
| 6,980,389 B1 | 12/2005 | Kupferman | |
| 6,987,636 B1 | 1/2006 | Chue et al. | |
| 6,987,639 B1 | 1/2006 | Yu | |
| 6,989,954 B1 | 1/2006 | Lee et al. | |
| 6,992,848 B1 | 1/2006 | Agarwal et al. | |
| 6,992,851 B1 | 1/2006 | Cloke | |
| 6,992,852 B1 | 1/2006 | Ying et al. | |
| 6,995,941 B1 | 2/2006 | Miyamura et al. | |
| 6,999,263 B1 | 2/2006 | Melkote et al. | |
| 6,999,267 B1 | 2/2006 | Melkote et al. | |
| 7,006,320 B1 | 2/2006 | Bennett et al. | |
| 7,016,134 B1 | 3/2006 | Agarwal et al. | |
| 7,023,637 B1 | 4/2006 | Kupferman | |
| 7,023,640 B1 | 4/2006 | Codilian et al. | |
| 7,027,256 B1 | 4/2006 | Subrahmanyam et al. | |
| 7,027,257 B1 | 4/2006 | Kupferman | |
| 7,035,026 B2 | 4/2006 | Codilian et al. | |
| 7,046,472 B1 | 5/2006 | Melkote et al. | |
| 7,050,249 B1 | 5/2006 | Chue et al. | |
| 7,050,254 B1 | 5/2006 | Yu et al. | |
| 7,050,258 B1 | 5/2006 | Codilian | |
| 7,054,098 B1 | 5/2006 | Yu et al. | |
| 7,061,714 B1 | 6/2006 | Yu | |
| 7,064,918 B1 | 6/2006 | Codilian et al. | |
| 7,068,451 B1 | 6/2006 | Wang et al. | |
| 7,068,459 B1 | 6/2006 | Cloke et al. | |
| 7,068,461 B1 | 6/2006 | Chue et al. | |
| 7,068,463 B1 | 6/2006 | Ji et al. | |
| 7,088,547 B1 | 8/2006 | Wang et al. | |
| 7,095,579 B1 | 8/2006 | Ryan et al. | |
| 7,110,208 B1 | 9/2006 | Miyamura et al. | |
| 7,110,214 B1 | 9/2006 | Tu et al. | |
| 7,113,362 B1 | 9/2006 | Lee et al. | |
| 7,113,365 B1 | 9/2006 | Ryan et al. | |
| 7,116,505 B1 | 10/2006 | Kupferman | |
| 7,126,781 B1 | 10/2006 | Bennett | |
| 7,158,329 B1 | 1/2007 | Ryan | |
| 7,180,703 B1 | 2/2007 | Subrahmanyam et al. | |
| 7,184,230 B1 | 2/2007 | Chue et al. | |
| 7,196,864 B1 | 3/2007 | Yi et al. | |
| 7,199,966 B1 | 4/2007 | Tu et al. | |
| 7,203,021 B1 | 4/2007 | Ryan et al. | |
| 7,209,321 B1 | 4/2007 | Bennett | |
| 7,212,364 B1 | 5/2007 | Lee | |
| 7,212,374 B1 | 5/2007 | Wang et al | |
| 7,215,503 B2 * | 5/2007 | Naik | 360/78.06 |
| 7,215,504 B1 | 5/2007 | Bennett | |
| 7,224,546 B1 | 5/2007 | Orakcilar et al. | |
| 7,248,426 B1 | 7/2007 | Weerasooriya et al. | |
| 7,251,098 B1 | 7/2007 | Wang et al. | |
| 7,253,582 B1 | 8/2007 | Ding et al. | |
| 7,253,989 B1 | 8/2007 | Lau et al. | |
| 7,265,933 B1 | 9/2007 | Phan et al. | |
| 7,289,288 B1 | 10/2007 | Tu | |
| 7,298,574 B1 | 11/2007 | Melkote et al. | |
| 7,301,717 B1 | 11/2007 | Lee et al. | |
| 7,304,819 B1 | 12/2007 | Melkote et al. | |
| 7,309,967 B2 | 12/2007 | Moser et al. | |
| 7,330,019 B1 | 2/2008 | Bennett | |
| 7,330,327 B1 | 2/2008 | Chue et al. | |
| 7,333,280 B1 | 2/2008 | Lifchits et al. | |
| 7,333,290 B1 | 2/2008 | Kupferman | |
| 7,339,761 B1 | 3/2008 | Tu et al. | |
| 7,352,523 B2 * | 4/2008 | Tan et al. | 360/75 |
| 7,365,932 B1 | 4/2008 | Bennett | |
| 7,382,570 B1 * | 6/2008 | Li et al. | 360/78.06 |
| 7,388,728 B1 | 6/2008 | Chen et al. | |
| 7,391,583 B1 | 6/2008 | Sheh et al. | |
| 7,391,584 B1 | 6/2008 | Sheh et al. | |
| 7,433,143 B1 | 10/2008 | Ying et al. | |
| 7,440,210 B1 | 10/2008 | Lee | |
| 7,440,225 B1 | 10/2008 | Chen et al. | |
| 7,450,334 B1 | 11/2008 | Wang et al. | |
| 7,450,336 B1 | 11/2008 | Wang et al. | |
| 7,453,661 B1 | 11/2008 | Jang et al. | |
| 7,457,071 B1 | 11/2008 | Sheh | |
| 7,466,509 B1 | 12/2008 | Chen et al. | |
| 7,468,855 B1 | 12/2008 | Weerasooriya et al. | |
| 7,477,471 B1 | 1/2009 | Nemshick et al. | |
| 7,480,116 B1 | 1/2009 | Bennett | |
| 7,489,464 B1 | 2/2009 | McNab et al. | |
| 7,492,546 B1 | 2/2009 | Miyamura | |
| 7,495,857 B1 | 2/2009 | Bennett | |
| 7,499,236 B1 | 3/2009 | Lee et al. | |
| 7,502,192 B1 | 3/2009 | Wang et al. | |
| 7,502,195 B1 | 3/2009 | Wu et al. | |
| 7,502,197 B1 | 3/2009 | Chue | |
| 7,505,223 B1 | 3/2009 | McCornack | |
| 7,542,225 B1 | 6/2009 | Ding et al. | |
| 7,548,392 B1 | 6/2009 | Desai et al. | |
| 7,551,390 B1 | 6/2009 | Wang et al. | |

(56) References Cited

U.S. PATENT DOCUMENTS

| | | |
|---|---|---|
| 7,558,016 B1 | 7/2009 | Le et al. |
| 7,573,670 B1 | 8/2009 | Ryan et al. |
| 7,576,941 B1 | 8/2009 | Chen et al. |
| 7,580,212 B1 | 8/2009 | Li et al. |
| 7,580,219 B2 * | 8/2009 | Derosa et al. ............ 360/78.06 |
| 7,583,470 B1 | 9/2009 | Chen et al. |
| 7,595,954 B1 | 9/2009 | Chen et al. |
| 7,602,575 B1 | 10/2009 | Lifchits et al. |
| 7,616,399 B1 | 11/2009 | Chen et al. |
| 7,619,844 B1 | 11/2009 | Bennett |
| 7,626,782 B1 | 12/2009 | Yu et al. |
| 7,630,162 B2 | 12/2009 | Zhao et al. |
| 7,639,447 B1 | 12/2009 | Yu et al. |
| 7,656,604 B1 | 2/2010 | Liang et al. |
| 7,656,607 B1 | 2/2010 | Bennett |
| 7,660,067 B1 | 2/2010 | Ji et al. |
| 7,660,070 B2 * | 2/2010 | Frisby et al. ............ 360/78.06 |
| 7,663,835 B1 | 2/2010 | Yu et al. |
| 7,675,707 B1 | 3/2010 | Liu et al. |
| 7,679,854 B1 | 3/2010 | Narayana et al. |
| 7,688,534 B1 | 3/2010 | McCornack |
| 7,688,538 B1 | 3/2010 | Chen et al. |
| 7,688,539 B1 | 3/2010 | Bryant et al. |
| 7,697,233 B1 | 4/2010 | Bennett et al. |
| 7,701,661 B1 | 4/2010 | Bennett |
| 7,710,676 B1 | 5/2010 | Chue |
| 7,715,138 B1 | 5/2010 | Kupferman |
| 7,729,079 B1 | 6/2010 | Huber |
| 7,733,189 B1 | 6/2010 | Bennett |
| 7,746,592 B1 | 6/2010 | Liang et al. |
| 7,746,594 B1 | 6/2010 | Guo et al. |
| 7,746,595 B1 | 6/2010 | Guo et al. |
| 7,760,461 B1 | 7/2010 | Bennett |
| 7,800,853 B1 | 9/2010 | Guo et al. |
| 7,800,856 B1 | 9/2010 | Bennett et al. |
| 7,800,857 B1 | 9/2010 | Calaway et al. |
| 7,839,591 B1 | 11/2010 | Weerasooriya et al. |
| 7,839,595 B1 | 11/2010 | Chue et al. |
| 7,839,600 B1 | 11/2010 | Babinski et al. |
| 7,843,662 B1 | 11/2010 | Weerasooriya et al. |
| 7,852,588 B1 | 12/2010 | Ferris et al. |
| 7,852,592 B1 | 12/2010 | Liang et al. |
| 7,864,481 B1 | 1/2011 | Kon et al. |
| 7,864,482 B1 | 1/2011 | Babinski et al. |
| 7,869,155 B1 | 1/2011 | Wong |
| 7,876,522 B1 | 1/2011 | Calaway et al. |
| 7,876,523 B1 | 1/2011 | Panyavoravaj et al. |
| 7,916,415 B1 | 3/2011 | Chue |
| 7,916,416 B1 | 3/2011 | Guo et al. |
| 7,916,420 B1 | 3/2011 | McFadyen et al. |
| 7,916,422 B1 | 3/2011 | Guo et al. |
| 7,929,238 B1 | 4/2011 | Vasquez |
| 7,961,422 B1 | 6/2011 | Chen et al. |
| 7,974,038 B2 | 7/2011 | Krishnan et al. |
| 8,000,053 B1 | 8/2011 | Anderson |
| 8,031,423 B1 | 10/2011 | Tsai et al. |
| 8,054,022 B1 | 11/2011 | Ryan et al. |
| 8,059,357 B1 | 11/2011 | Knigge et al. |
| 8,059,360 B1 | 11/2011 | Melkote et al. |
| 8,072,703 B1 | 12/2011 | Calaway et al. |
| 8,077,428 B1 | 12/2011 | Chen et al. |
| 8,078,901 B1 | 12/2011 | Meyer et al. |
| 8,081,395 B1 | 12/2011 | Ferris |
| 8,085,020 B1 | 12/2011 | Bennett |
| 8,116,023 B1 | 2/2012 | Kupferman |
| 8,145,934 B1 | 3/2012 | Ferris et al. |
| 8,179,626 B1 | 5/2012 | Ryan et al. |
| 8,189,286 B1 | 5/2012 | Chen et al. |
| 8,213,106 B1 | 7/2012 | Guo et al. |
| 8,254,222 B1 | 8/2012 | Tang |
| 8,300,348 B1 | 10/2012 | Liu et al. |
| 8,315,005 B1 | 11/2012 | Zou et al. |
| 8,320,069 B1 | 11/2012 | Knigge et al. |
| 8,351,174 B1 | 1/2013 | Gardner et al. |
| 8,358,114 B1 | 1/2013 | Ferris et al. |
| 8,358,145 B1 | 1/2013 | Ferris et al. |
| 8,390,367 B1 | 3/2013 | Bennett |
| 8,432,031 B1 | 4/2013 | Agness et al. |
| 8,432,629 B1 | 4/2013 | Rigney et al. |
| 8,451,697 B1 | 5/2013 | Rigney et al. |
| 8,482,873 B1 | 7/2013 | Chue et al. |
| 8,498,076 B1 | 7/2013 | Sheh et al. |
| 8,498,172 B1 | 7/2013 | Patton, III et al. |
| 8,508,881 B1 | 8/2013 | Babinski et al. |
| 8,531,798 B1 | 9/2013 | Xi et al. |
| 8,537,486 B2 | 9/2013 | Liang et al. |
| 8,542,455 B2 | 9/2013 | Huang et al. |
| 8,553,351 B1 | 10/2013 | Narayana et al. |
| 8,564,899 B2 | 10/2013 | Lou et al. |
| 8,576,506 B1 | 11/2013 | Wang et al. |
| 8,605,382 B1 | 12/2013 | Mallary et al. |
| 8,605,384 B1 | 12/2013 | Liu et al. |
| 8,610,391 B1 | 12/2013 | Yang et al. |
| 8,611,040 B1 | 12/2013 | Xi et al. |
| 8,619,385 B1 | 12/2013 | Guo et al. |
| 8,630,054 B2 | 1/2014 | Bennett et al. |
| 8,630,059 B1 | 1/2014 | Chen et al. |
| 8,634,154 B1 | 1/2014 | Rigney et al. |
| 8,634,283 B1 | 1/2014 | Rigney et al. |
| 8,643,976 B1 | 2/2014 | Wang et al. |
| 8,649,121 B1 | 2/2014 | Smith et al. |
| 8,654,466 B1 | 2/2014 | McFadyen |
| 8,654,467 B1 | 2/2014 | Wong et al. |
| 8,665,546 B1 | 3/2014 | Zhao et al. |
| 8,665,551 B1 | 3/2014 | Rigney et al. |
| 8,670,206 B1 | 3/2014 | Liang et al. |
| 8,687,312 B1 | 4/2014 | Liang |
| 8,693,123 B1 | 4/2014 | Guo et al. |
| 8,693,134 B1 | 4/2014 | Xi et al. |
| 8,699,173 B1 | 4/2014 | Kang et al. |
| 8,711,027 B1 | 4/2014 | Bennett |
| 8,717,696 B1 | 5/2014 | Ryan et al. |
| 8,717,699 B1 | 5/2014 | Ferris |
| 8,717,704 B1 | 5/2014 | Yu et al. |
| 8,724,245 B1 | 5/2014 | Smith et al. |
| 8,724,253 B1 | 5/2014 | Liang et al. |
| 8,724,524 B2 | 5/2014 | Urabe et al. |
| 8,737,008 B1 | 5/2014 | Watanabe et al. |
| 8,737,013 B2 | 5/2014 | Zhou et al. |
| 8,743,495 B1 | 6/2014 | Chen et al. |
| 8,743,503 B1 | 6/2014 | Tang et al. |
| 8,743,504 B1 | 6/2014 | Bryant et al. |
| 8,749,904 B1 | 6/2014 | Liang et al. |
| 8,760,796 B1 | 6/2014 | Lou et al. |
| 8,767,332 B1 | 7/2014 | Chahwan et al. |
| 8,767,343 B1 | 7/2014 | Helmick et al. |
| 8,767,354 B1 | 7/2014 | Ferris et al. |
| 8,773,787 B1 | 7/2014 | Beker |
| 8,779,574 B1 | 7/2014 | Agness et al. |
| 8,780,473 B1 | 7/2014 | Zhao et al. |
| 8,780,477 B1 | 7/2014 | Guo et al. |
| 8,780,479 B1 | 7/2014 | Helmick et al. |
| 8,780,489 B1 | 7/2014 | Gayaka et al. |
| 8,792,202 B1 | 7/2014 | Wan et al. |
| 8,797,664 B1 | 8/2014 | Guo et al. |
| 8,804,267 B2 | 8/2014 | Huang et al. |
| 8,824,081 B1 | 9/2014 | Guo et al. |
| 8,824,262 B1 | 9/2014 | Liu et al. |
| 2010/0035085 A1 | 2/2010 | Jung et al. |
| 2012/0284493 A1 | 11/2012 | Lou et al. |
| 2013/0120870 A1 | 5/2013 | Zhou et al. |
| 2013/0148240 A1 | 6/2013 | Ferris et al. |

* cited by examiner

DATA STORAGE DEVICE ADJUSTING SEEK PROFILE BASED ON SEEK LENGTH WHEN ENDING TRACK IS NEAR RAMP

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo data 12 and servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

DETAILED DESCRIPTION

Figure 1:
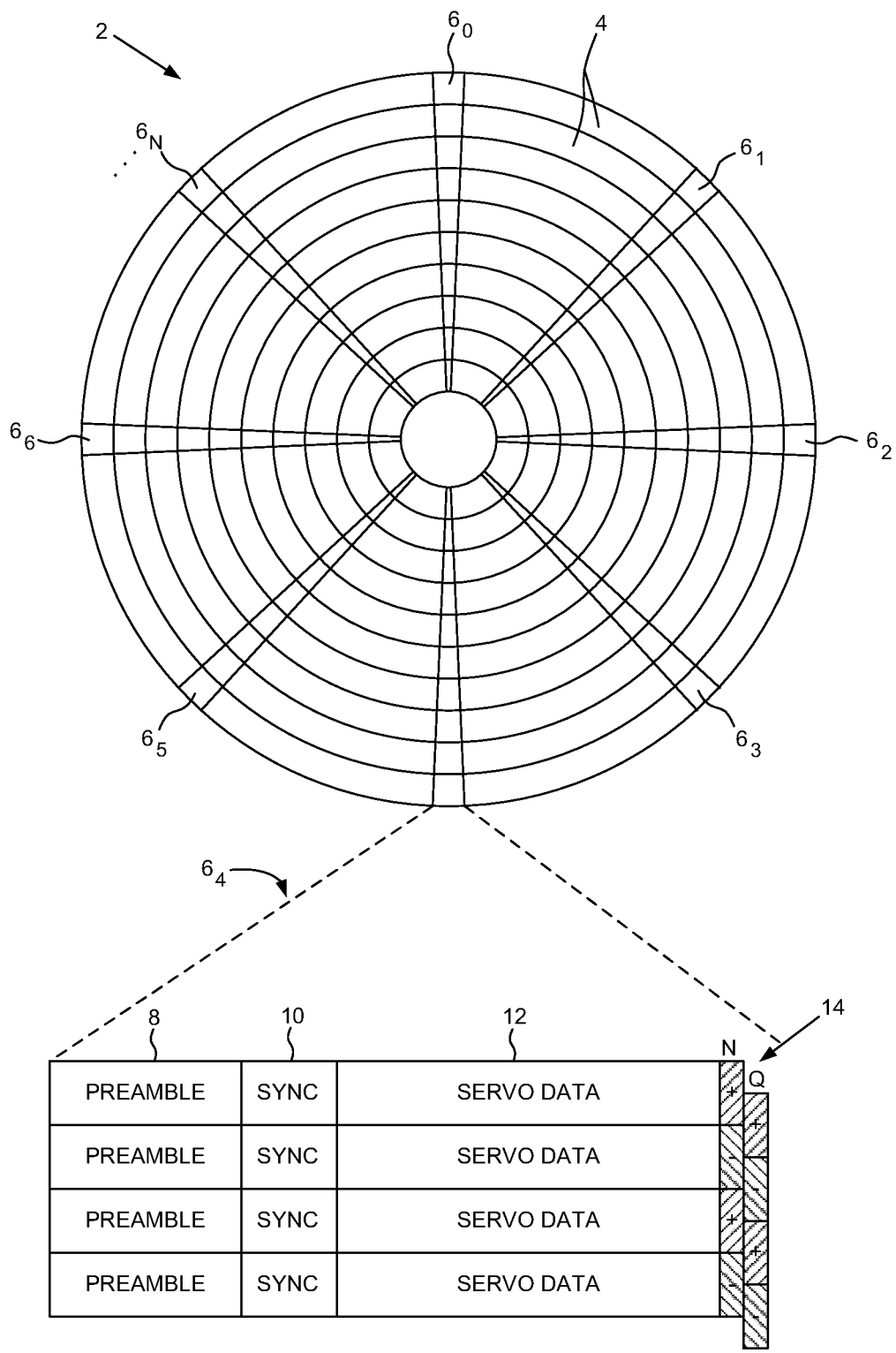
FIG. 1 shows a prior art disk format comprising a plurality of tracks defined by servo sectors.
Figure 2A:
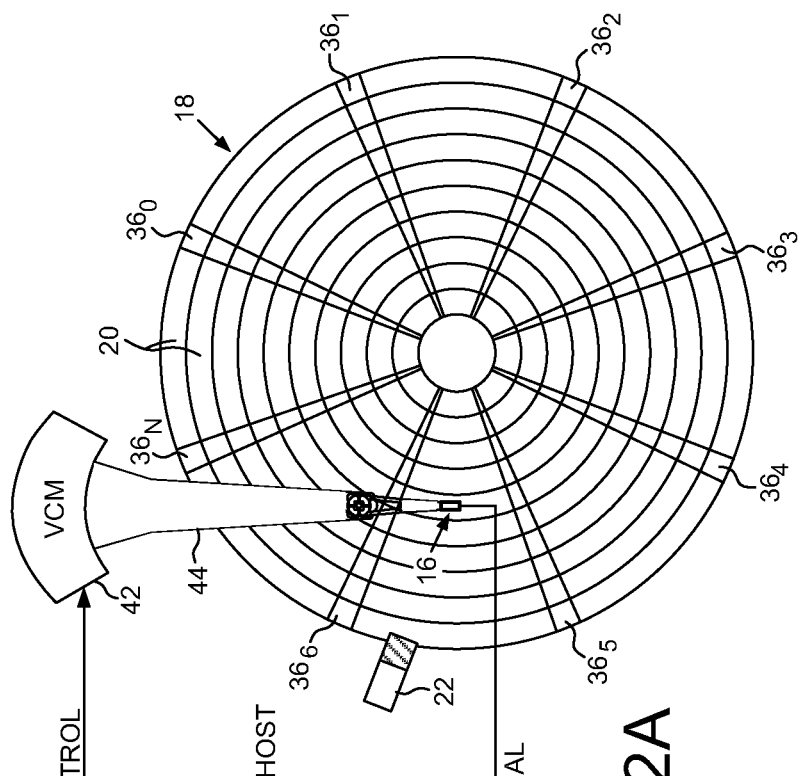
FIG. 2A shows a data storage device in the form of a disk drive comprising a head actuated over a disk and a load/unload ramp.
Figure 2B:
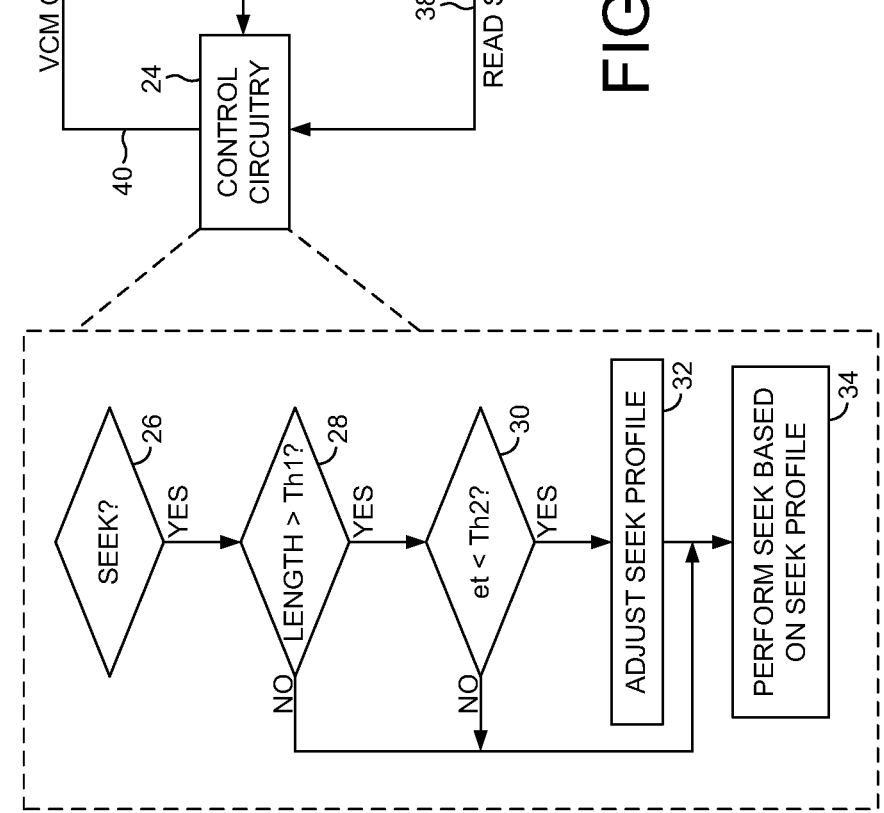
FIG. 2B is a flow diagram according to an embodiment wherein when seeking the head a seek length from a starting track to an ending track, control circuit is configured to adjust a seek profile when the seek length is greater than a first threshold and the ending track is within a second threshold of a load/unload ramp.

FIG. 2A shows a data storage device in the form of a disk drive according to an embodiment comprising a head 16 actuated over a disk 18 comprising a plurality of tracks 20, and a load/unload ramp 22. The disk drive further comprises control circuitry 24 configured to execute the flow diagram of FIG. 2B, wherein when seeking the head a seek length from a starting track to an ending track (block 26), the control circuit 24 is configured to adjust a seek profile (block 32) when the seek length is greater than a first threshold (block 28) and the ending track is within a second threshold of the load/unload ramp (block 30). The control circuitry 24 executes the seek based on the adjusted seek profile (block 34).

In the embodiment of FIG. 2A, the disk 18 comprises a plurality of servo tracks 20 defined by servo sectors $36_0$-$36_N$, wherein data tracks are defined relative to the servo tracks at the same or different radial density. The control circuitry 24 processes a read signal 38 emanating from the head 16 to demodulate the servo sectors $36_0$-$36_N$ and generate a position error signal (PES) representing an error between the actual position of the head and a target position relative to a target track. The control circuitry 24 filters the PES using a suitable compensation filter to generate a control signal 40 applied to a voice coil motor (VCM) 42 which rotates an actuator arm 44 about a pivot in order to actuate the head 16 radially over the disk 18 in a direction that reduces the PES. The servo sectors $36_0$-$36_N$ may comprise any suitable head position information, such as a track address for coarse positioning and servo bursts for fine positioning. The servo bursts may comprise any suitable pattern, such as an amplitude based servo pattern or a phase based servo pattern.

When the disk drive is powered down or in an idle mode, the head 16 is parked on the load/unload ramp 22 which in the embodiment of FIG. 2A is mounted so as to extend over an outer edge of the disk 18. When the disk drive is powered on, the disk 18 is spun up to an operating speed and the head 16 is "loaded" from the ramp 22 over the spinning disk 18. If a power failure occurs, the control circuitry 24 may execute an emergency "unload" operation wherein the head 16 is retracted toward and then onto the ramp 22. In one embodiment, the momentum of the disk 18 spinning generates a back electromotive force (BEMF) voltage across the windings of a spindle motor that rotates the disk 18, and this BEMF voltage may be used to drive the VCM 42 to execute the unload operation. In one embodiment, if a power failure occurs during a normal seek operation while the head is seeking toward the ramp 22 and the head 16 is within a threshold distance from the ramp 22 when the power failure occurs, the emergency unload operation may be unable to control the speed of the head 16 as it approaches the ramp 22, resulting in damage to the head 16 when it contacts the ramp 22.

Figure 3A:
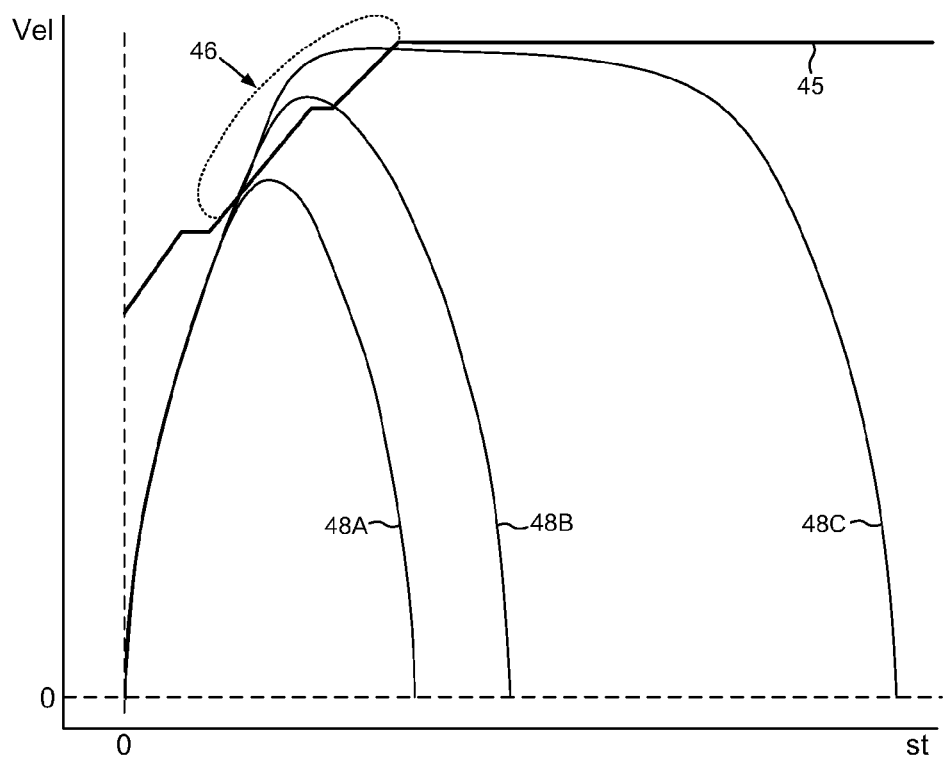
FIG. 3A illustrates a "no man's land" area of a phase plane that is avoided during seek operations to avoid damaging the head during an emergency unload operation according to an embodiment.

FIG. 3A is a phase plane representing a position of the head 16 and a velocity of the head 16 during a seek operation. A seek profile may be defined in the phase plane from a starting track to an ending track (in this example the ending track is the first track near the ramp 22), wherein the control circuitry 24 may generate the control signal 40 applied to the VCM 42 so that the position/velocity states follow the seek profile. As illustrated in FIG. 3A, in one embodiment the shape of the seek profile, including an amplitude of a coast velocity, may depend on the seek length. FIG. 3A also shows a boundary line 45 that defines a "no man's land" area 46 in the phase plane where the head 16 may be damaged if the position/velocity states are within this area during a seek operation and a power failure occurs requiring an emergency unload. Accordingly, in one embodiment the seek profile for seeking the head from a starting track to an ending track is adjusted (e.g., before or during a seek operation) so that the position/velocity states avoid the "no man's land" area 46 shown in FIG. 3A. Referring to the example seek profiles shown in FIG. 3A, the seek profile 48A does not extend into the "no man's land" of the phase plane and so the seek profile 48A need not be adjusted. However, seek profiles 48B and 48C do extend into the "no man's land" and so in one embodiment these seek profiles are adjusted to avoid this area of the phase plane.

Figure 3B:
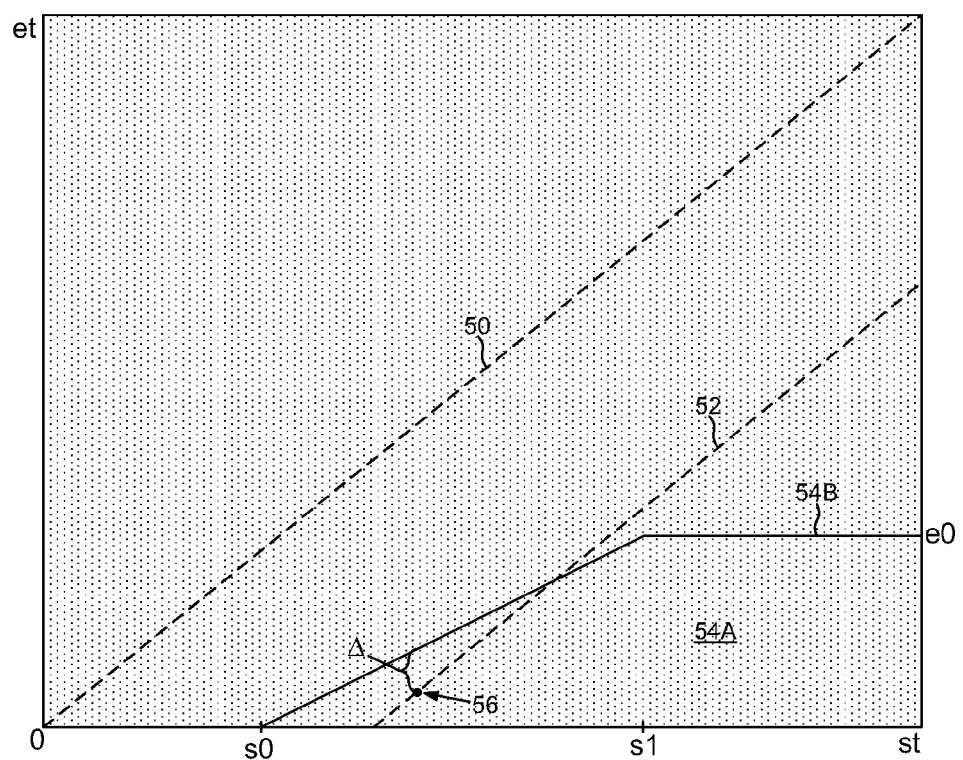
FIG. 3B shows the entire seek space for the disk drive, including the seeks wherein the seek profile is adjusted to avoid the "no man's land" area illustrated in FIG. 3A.

In one embodiment, whether the seek profile needs adjusting and the extent of the adjusting is determined based on the seek length as well as the distance that the ending track of the seek is from the load/unload ramp 22. An example of this embodiment is illustrated in FIG. 3B which is a seek space showing all possibilities of the starting track and the ending track for any given seek (the x-axis represents the starting track and the y-axis represents the ending track). The diagonal line 50 represents a zero length seek due to the starting track being equal to the ending track. The diagonal line 52 represents a constant length seek due to the distance between the starting track and ending track being equal as both the starting track and ending track shifting away from the ramp 22. The area 54A of the seek space shown in FIG. 3B defined by line 54B represents the seek lengths and the ending tracks near the ramp 22 where the seek profile needs adjustment to avoid the "no man's land" shown in FIG. 3A. For example, the point 56 of the seek space which is in area 54A represents a particular ending track (y-axis) for a seek length defined by the corresponding starting track (x-axis). If the ending track is shifted away from the ramp 22 by the delta ($\Delta$) shown in FIG. 3B, the point 56 would shift out of the area 54 so that no adjustment to the seek profile would be needed. Accordingly, in one embodiment the seek profile is adjusted based on the delta ($\Delta$), wherein the adjustment may be proportional or any other suitable function of the delta ($\Delta$).

Figure 4:
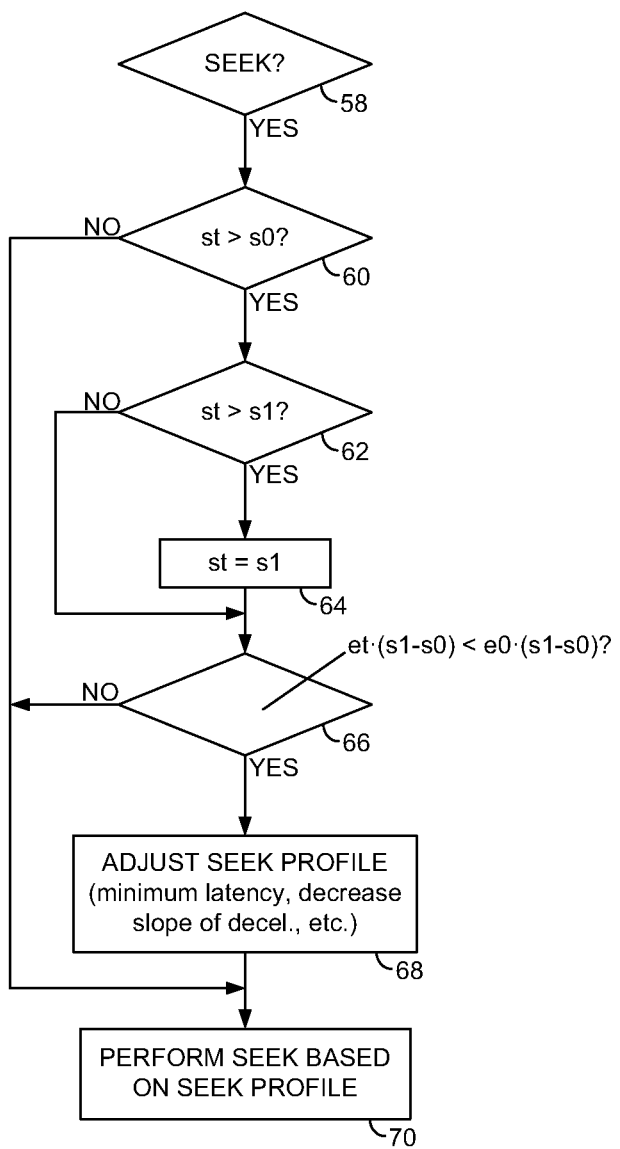
FIG. 4 is a flow diagram according to an embodiment wherein the seek profile may be adjusted by enforcing a minimum latency for the seek profile, or by decreasing a deceleration slope for the seek profile, or by employing any other suitable technique.

FIG. 4 is a flow diagram according to an embodiment for determining when an adjustment to the seek profile is needed to avoid the "no man's land" of FIG. 3A. When seeking the head (block 58) from a starting track (st) to an ending track (et), the starting track (st) is compared to a first threshold track (s0) (block 60), wherein the first threshold track (s0) is shown in the example of FIG. 3B. If the starting track (st) of the seek is less than the first threshold track (s0), then the seek length will always be short enough so that the seek profile will avoid the "no man's land" of FIG. 3A, and therefore no adjustment to the seek profile is needed. If the starting track (st) of the seek is greater than the first threshold track (s0) at block 60, then the starting track (st) is compared to a second threshold track (s1) (block 62), wherein the second threshold track (s1) is shown in the example of FIG. 3B. If the starting track (st) is greater than the second threshold track (s1) at block 62, then the starting track (st) is set equal to the second threshold track (block 64). If the inequality shown in block 66 is true (where e0 is a third threshold track shown in FIG. 3B), it means an adjustment to the seek profile is needed (block 68) in order to avoid the "no man's land" of FIG. 3A. The seek profile may be adjusted at block 68 in any suitable manner that will result in the seek profile avoiding the "no man's land" of FIG. 3A, such as by enforcing a minimum latency for the seek profile (which may decrease the coast velocity of the seek profile), or by decreasing a deceleration slope for the seek profile, or by employing any other suitable technique. The seek is then performed at block 70 using either the unadjusted or the adjusted seek profile.

As described above, in one embodiment a parameter of the seek profile may be adjusted at block 68 of FIG. 4 based on the delta ($\Delta$) between the ending track (et) of the seek and the line 54B representing the border of the adjustment area 54A shown in FIG. 3B. The adjustment to the seek parameter may be proportional to the delta ($\Delta$), or any other suitable function of the delta ($\Delta$). In one embodiment, the "no man's land" area 46 shown in FIG. 3A may be determined based on the amount of power that may be provided by the BEMF voltage of the spindle motor during an emergency unload operation.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

In various embodiments, a disk drive may include a magnetic disk drive, an optical disk drive, etc. In addition, while the above examples concern a disk drive, the various embodiments are not limited to a disk drive and can be applied to other data storage devices and systems, such as magnetic tape drives, solid state drives, hybrid drives, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
a disk comprising a plurality of tracks;
a head actuated over the disk;
a load/unload ramp; and
control circuitry configured to seek the head a seek length from a starting track to an ending track by adjusting a seek profile when the seek length is greater than a first threshold and the ending track is within a second threshold of the load/unload ramp.

2. The data storage device as recited in claim 1, wherein the control circuitry is further configured to adjust the seek profile when:

$$et \cdot (s1-s0) < e0 \cdot (st-s0)$$

where:
st represents the starting track;
et represents the ending track;
e0 represents a maximum for the second threshold;
s0 represents the first threshold; and
s1 represents a third threshold.

3. The data storage device as recited in claim 2, wherein the control circuitry is further configured to determine whether to adjust the seek profile by setting st equal to s1 when st is greater than s1.

4. The data storage device as recited in claim 1, wherein the control circuitry is further configured to adjust the seek profile by enforcing a minimum latency for the seek profile.

5. The data storage device as recited in claim 1, wherein the control circuitry is further configured to adjust the seek profile by decreasing a deceleration slope for the seek profile.

6. A method of operating a data storage device, the method comprising seeking a head over a disk a seek length from a starting track to an ending track on the disk by adjusting a seek profile when the seek length is greater than a first threshold and the ending track is within a second threshold of a load/unload ramp.

7. The method as recited in claim 6, further comprising adjusting the seek profile when:

$$et \cdot (s1 \cdot s0) < e0 \cdot (st-s0)$$

where:
st represents the starting track;
et represents the ending track;
e0 represents a maximum for the second threshold;
s0 represents the first threshold; and
s1 represents a third threshold.

8. The method as recited in claim 7, further comprising determining whether to adjust the seek profile by setting st equal to s1 when st is greater than s1.

9. The method as recited in claim 6, further comprising adjusting the seek profile by enforcing a minimum latency for the seek profile.

10. The method as recited in claim 6, further comprising adjusting the seek profile by decreasing a deceleration slope for the seek profile.

* * * * *